Sept. 2, 1969 J. A. MACHEK 3,464,523
DISC BRAKE AND ANTIRATTLE MEANS THEREFOR
Filed March 8, 1968 4 Sheets-Sheet 1

INVENTOR
JOHN A. MACHEK
BY William R. O'Meara

INVENTOR
JOHN A. MACHEK
BY William R. O'Meara

United States Patent Office 3,464,523
Patented Sept. 2, 1969

3,464,523
DISC BRAKE AND ANTIRATTLE MEANS THEREFOR
John A. Machek, Berkeley, Mo., assignor to Wagner Electric Corporation, Newark, N.J., a corporation of Delaware
Filed Mar. 8, 1968, Ser. No. 711,796
Int. Cl. F16d 55/224, 65/72
U.S. Cl. 188—73                        19 Claims

ABSTRACT OF THE DISCLOSURE

A disc brake is provided with a support member having a pair of anchor means thereon, and another member is movable on said support means for urging a pair of friction members into frictional engagement with the opposed sides of a disc. The brake includes resiliently urged means connected between the support member and the other member for normally urging said other member toward engagement with one of the anchor means. The brake also includes a hold-down device connected between the support member and the other member having a spacer press-fitted through a slot in said other means into slidable and displacement preventing engagement with said other member.

---

This invention relates to friction devices and more particularly to disc brakes.

In the past, certain disc brakes of the type having a caliper frame movable to apply brake shoes against opposed sides of the brake disc had certain disadvantageous or undesirable features. These undesirable features included excessive taper wear and shortened brake shoe life, "rattle" noise, large space requirements, and relatively high cost of manufacture. For example, in some past disc brake constructions, the movable frame had an undesirable amount of freedom of movement in directions other than the desired axial or brake applying direction under dynamic conditions, and this resulted in excessive taper wear of one or both of the brake shoes and shortened brake shoe life, and, in some cases, an undesirable amount of noise. In such past disc brake constructions of the type having a closed loop frame in which a brake actuator or wheel cylinder is utilized to move the inboard brake shoe in one direction against one side of the disc and to move the frame in the opposite direction to, in turn, move the outboard brake shoe against the opposite side of the disc, moments were produced due to the transfer of torque from the outboard shoe to the frame that tended to rotate the frame in its own plane, and which resulted in excessive taper wear on the outboard shoe due to excessive freedom of angular movement or rotation of the frame as a result of manufacturing tolerances and stresses on parts of the brake.

An object of the present invention is to provide a disc brake which overcomes the aforementioned undesirable or disadvantageous features, and this, as well as other objects and advantageous features of the present invention, will become apparent in the specification which follows.

Briefly, in accordance with one aspect of the present invention, a friction device is provided which includes support means adapted for connection adjacent to rotatable disc means and having a pair of spaced anchor means, a movable member for anchoring engagement with the anchor means and having interconnected portions disposed respectively on opposed sides of the disc, a friction member between one portion and one disc side, another friction member between the other portion and the other disc side, said other portion including actuating means for moving the other friction member in one direction into frictional engagement with the disc and the movable member in the opposite direction to move the first named friction member into frictional engagement with the disc, the torque of the frictional engagement of the friction members being transmitted to one of the anchor means when the disc is rotating in one direction.

Figure 1:
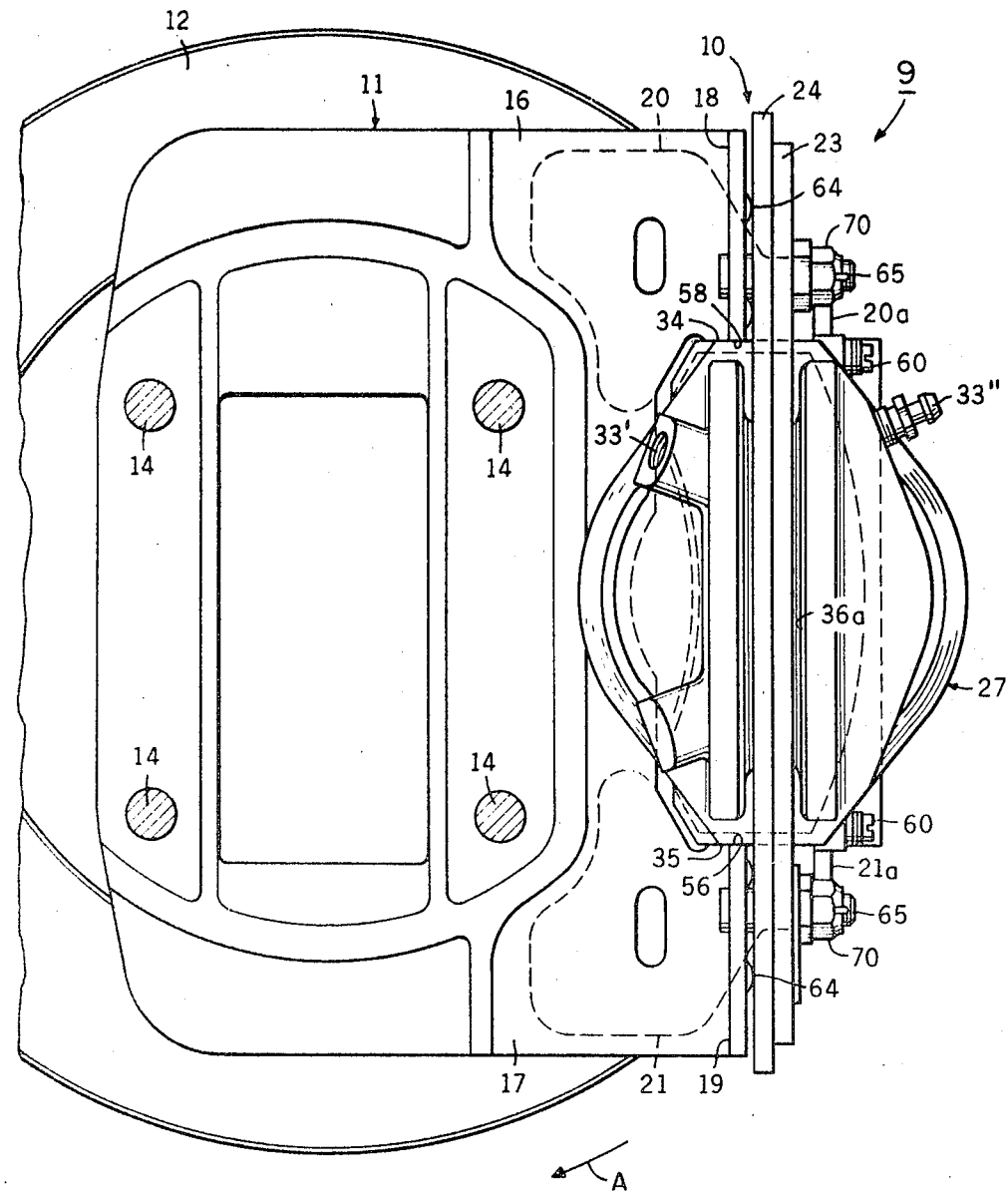
Figure 2:
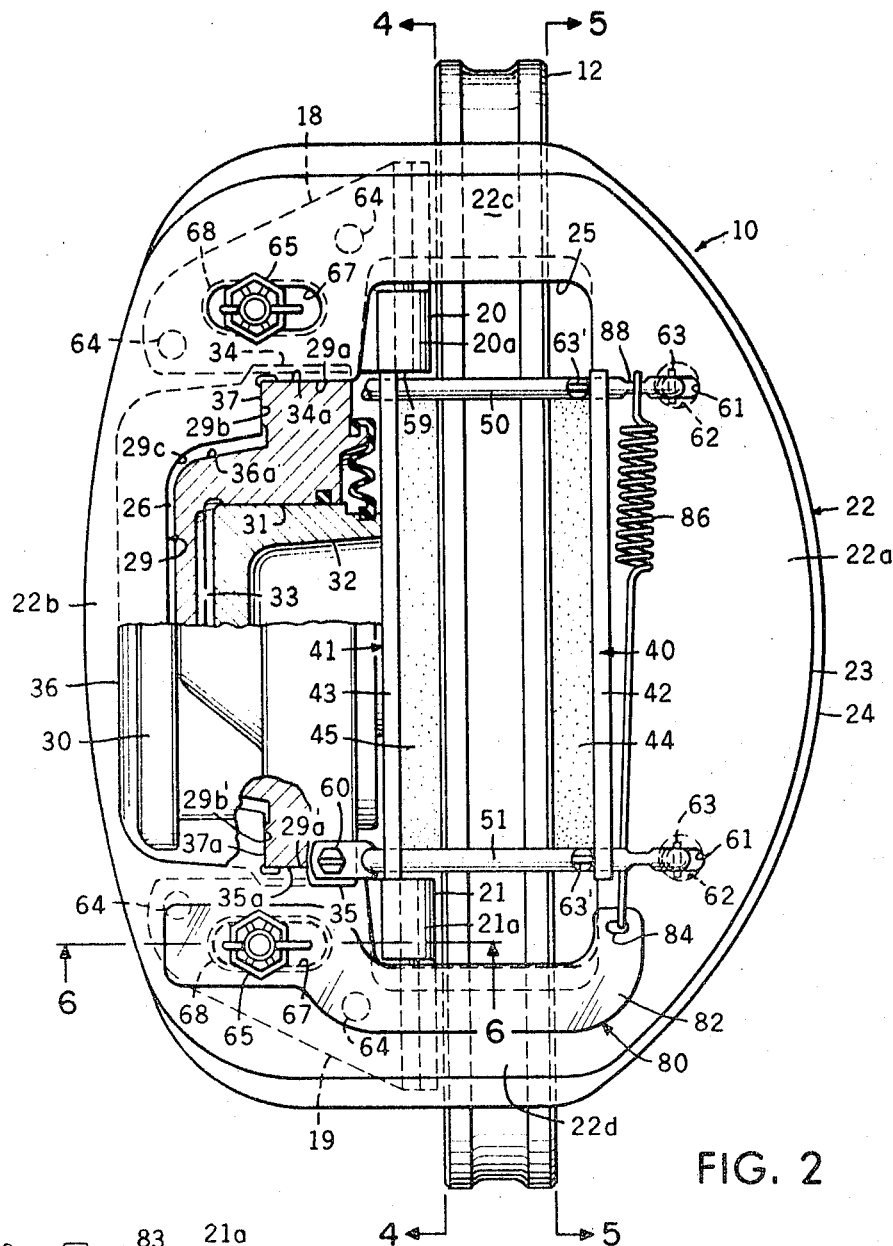
Figure 6:
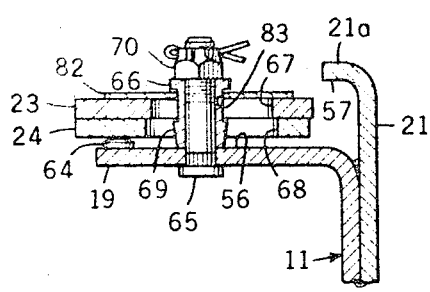
Figure 3:
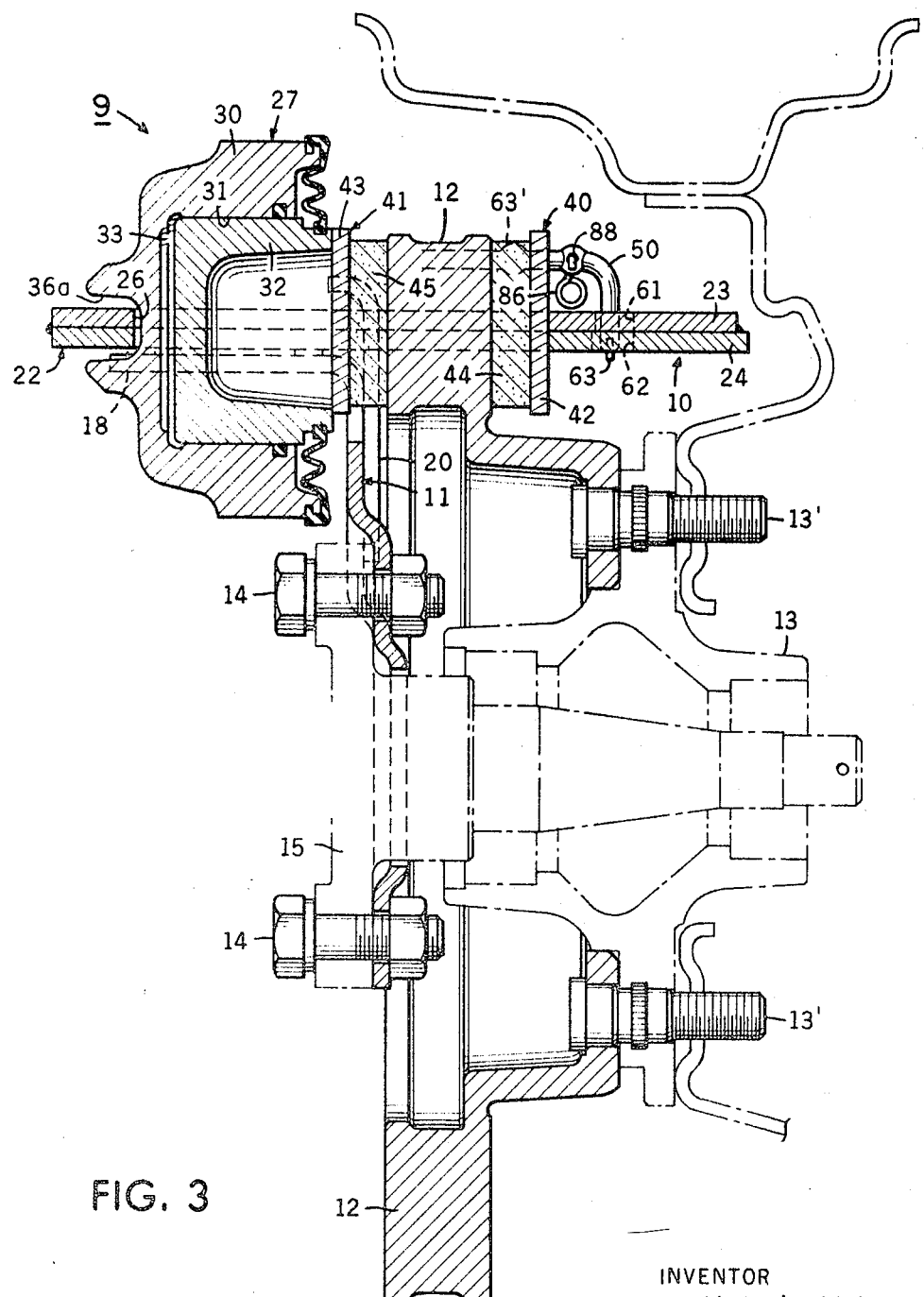
Figures 4, 5:
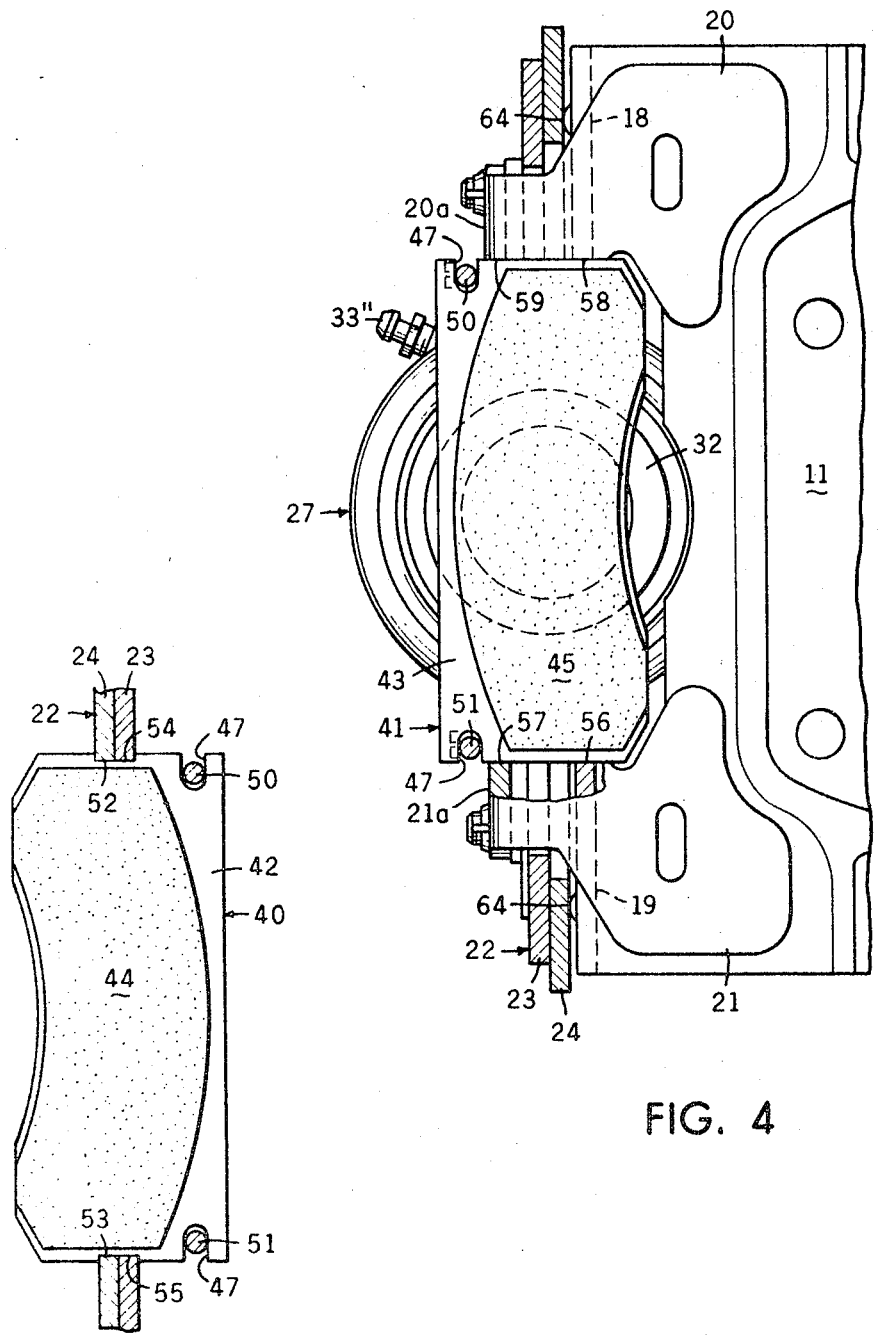

In the drawings which illustrate embodiments of the present invention and wherein like numerals refer to like parts wherever they occur, FIG. 1 is an elevational view of a disc brake according to the present invention, FIG. 2 is a plan view, partly in section, of the brake of FIG. 1, FIG. 3 is a sectional view taken along the line 3—3 of FIG. 2, FIG. 4 is a sectional view taken along the line 4—4 of FIG. 2, FIG. 5 is a sectional view taken along the line 5—5 of FIG. 2, and FIG. 6 is a sectional view taken along line 6—6 of FIG. 2.

Referring now to the drawings and particularly to FIGS. 1–4, there is illustrated a disc brake 9 which includes a disc brake unit, indicated generally at 10, mounted on a non-rotatable support member 11 which extends adjacent one side of a rotor or disc 12 having opposed annular braking surfaces and connected for rotation with a hub 13 (FIG. 3) of a vehicle wheel by a plurality of bolts 13'.

Support member 11 is in the form of a sheet-metal stamping secured by bolts 14 to a stationary part shown as an axle spindle or flange 15. Support member 11 extends parallel to the plane of disc 12 and is provided with a pair of circumferentially spaced arms 16 and 17 (FIG. 1) having flanges 18 and 19, each flange being in a plane normal to the plane of disc 12. Flanges 18 and 19 provide a supporting table for the brake unit 10, as will be explained in greater detail hereinafter. The arms 16 and 17 are provided with a pair of strengthening and torque-taking members 20 and 21, respectively, that are secured, such as by welding, to the upper portions of the arms, members 20 and 21 extending radially upwardly beyond the plane of flanges 18 and 19 and have upper end portions 20a and 21a, respectively, which extend in a plane parallel to the plane of flanges 18 and 19. The flange 18 and member 20 together and the flange 19 and member 21 together define spaced anchors on support 11 for the brake unit 10.

The brake unit 10 includes a movable or sliding beam or frame 22, shown as a closed loop member, extending chordwise of disc 12. The frame 22 has a pressure portion, indicated at 22a, on one side of disc 12 and a reaction portion, indicated at 22b, on the opposite side of disc 12, the pressure and reaction portions 22a and 22b being connected together by end portions 22c and 22d which extend across the outer periphery of disc 12. Frame 22 includes a pair of sheet-metal plates or stampings 23 and 24 secured together, such as by welding, and has formed therein an opening 25 through which a peripheral or chordal portion of disc 12 rotates, and an opening 26 in the reaction portion 22b intersecting opening 25 and in which a brake actuating member 27, shown as a fluid pressure responsive motor or hydraulic wheel cylinder, is secured.

Opening 26 has a peripheral edge 29 (FIG. 2) including a pair of opposed axially extending edge portions 29a and 29a' which intersect the edge of opening 25, edge portions 29b and 29b' connecting with and extending normal to edge portions 29a and 29a', and a curving or cup-shaped bottom edge portion 29c which extends between portions 29b and 29b'.

The wheel cylinder 27 includes a housing 30 having a bore 31 and an actuating piston 32 slidably and sealably engaging the bore and defining therewith an expansible chamber 33 which is provided with a pressure fluid inlet at 33' and a bleeder opening at 33". The housing 30 has a pair of opposed, axially extending outer side walls 34 and 35 and a rear wall 36 closing one end of bore 31. The walls 34, 35 and 36 are provided with grooves 34a, 35a and 36a, respectively, which receive portions of the peripheral edge 29 of frame 22 to obviate radial movement of the cylinder 27. The rear wall groove 36a extends radially inwardly with respect to the cylinder bore 31 from the grooves 34a and 35a to provide abutments 37 and 37a adjacent the opposed sides of the cylinder housing 30. During assembly, the housing 30 is pressed axially into the opening 26, the opposed peripheral edge portions 29a, 29a' of frame member 22 being a slight press-fit with or frictionally engaging side wall grooves 34a and 35a, respectively. The cylinder 27 is moved axially into opening 26 until the peripheral edge portions 29b and 29b' respectively, engage the abutments 37 and 37a. The housing 30 and frame 22, in some cases, may be integrally formed, if desired.

A pair of like friction members or brake shoes 40, 41 are mounted in facing relation on opposite sides of disc 12 within the opening 25. Brake shoes 40 and 41 include backing plates 42 and 43, respectively, and pads of friction material 44 and 45 respectively secured to the backing plates 42 and 43, such as by rivets or conventional bonding means. As seen also in FIGS. 4 and 5, each of the backing plates 42 and 43 is provided with a pair of slots or grooves 47 formed in the opposed ends thereof which receive mounting or hold-down rods 50 and 51, as will be more fully described hereinafter.

Brake shoe 40 is mounted on pressure portion 22a of frame 22 for movement therewith. The pressure portion 22a has a shallow cutout or opening with opposed walls 52 and 53 (FIG. 5) which are respectively engageable with the bottom walls of notches 54 and 55 provided in the opposed ends of backing plate 42 to provide torque transmitting connections between the backing plate 42 and frame 22. The other brake shoe 41 is disposed axially between the piston 32 and the disc 12 and circumferentially between arms 16 and 17 of the support member 11, the radially outer portions of the arms providing sliding anchoring or torque-taking connections between the backing plate 43 and the support member 11. As seen in FIGS. 2 and 4, one end of backing plate 43 slidably anchors on portions of arm 17 including inner side 56 of flange 19 and inner side 57 of arm extension 21. Similarly, the other end of backing plate 43 slidably anchors on portions of arm 16 including inner side 58 of flange 18 and inner side 59 of the arm extension 20, as is also apparent in FIG. 3. Thus, the shoe 41 is directly slidably engageable with support member 11 below and above the frame 22.

Each of the mounting rods 50 and 51 is secured to the housing 30 adjacent one end thereof by a screw 60 (FIG. 1) and extends axially across the periphery of disc 12 and through slots 47 of the backing plates 42 and 43. The right ends of rods 50 and 51 curve downwardly, as seen in FIGS. 2 and 3, and extend through elongated slots 61 provided in the plate 23 in the pressure portion 22a of the frame 22. Enlarged holes 62 are provided in the plate 24 respectively in registration with the slots 61. Extension abutments 63 (FIG. 2) are provided on the lower end of rods 50 and 51 that extend cross-wise the narrow dimensions of slots 61 and engage the lower side of plate 23 to prevent movement of these ends outwardly of the frame 22 when in assembled relation, as shown in the drawings. Another pair of extension abutments 63' are shown on the rods 50 and 51 on the disc side of backing plate 42 to insure that backing plate 40 remains between the torque-transmitting walls 52 and 53 of frame 22. The abutments 63 and 63' are shown as extrusions on the rods 50 and 51. With this arrangement, the brake shoes 40 and 41 are readily inserted and removed from the brake unit 10. For example, by removing the screws 60 from their mounting holes in the housing 30 and moving the left ends of rods 50 and 51 apart, as viewed in FIG. 2, the rods leave the slots 47 of backing plates 42 and 43 and free the brake shoes 40 and 41 for removal. When desired, the rods 50 and 51 may be removed from frame 22 by moving them apart until the abutments 63 extend lengthwise of the longer dimension of slots 61 so that the abutments 63 will pass through slots 61. With the rods 50 and 51 removed from the backing plate slots 47, shoe 40 can be moved slightly toward disc 12 until the slots 54 and 55 (FIG. 5) are free of the frame 22, and then radially outwardly from the brake unit 10. If necessary, the frame 22 can be moved axially rightwardly to provide sufficient space for the removal of shoe 40. The shoe 41 can simply be lifted radially outwardly of the unit 10. With the rods 50 and 51 apart, new brake shoes can be inserted and then the rods 50 and 51 returned to the positions shown in FIG. 2 to hold the new shoes in place.

The brake unit 10 is mounted for axial sliding movement on the flanges 18 and 19 of support member 11. Each of the flanges 18 and 19 is shown provided with a pair of rounded bearing surfaces shown as buttons 64 on which frame 22 is slidable. The buttons 64 are shown as extrusions of the flanges. A pair of mounting studs 65 are respectively press-fitted in openings in the flanges 18 and 19 and extend through spacers 66 that are disposed in registering openings or slots 67 and 68, respectively, in the frame plates 23 and 24 on opposite sides of cylinder 27. The slots 67 and 68 are relatively long in the axial direction, opening 68 being slightly larger than opening 67. As seen in FIG. 6, the spacer 66 is provided with an enlargement 69 which, during assembly, is pressed through opening 67 in the plate 23 and into larger opening 68 in plate 24, whereby the spacer, after insertion, cannot fall out of opening 67. The distance from the bottom of the spacer to the head thereof is greater than the thickness of frame 22 plus the height of the buttons 64 so that when the nuts 70 are tightened down against the heads of the spacer 66, the spacers 66 insure freedom of movement of frame 22 relative to the support member 11.

Referring especially to FIG. 1, the opposed sides 34 and 35 of the housing 30 slidably engage facing sides 56 and 58, respectively, of the flanges 18 and 19, the flanges guiding the brake unit 10 for axial movement. The sides 56 and 58 of flanges 18 and 19 provide anchors or torque-taking connections for the frame 22.

In operation, assuming the disc 12 to be rotating in the forward direction, as indicated by the arrow in FIG. 2, when fluid pressure is supplied to chamber 33 through inlet 33', for example, from a vehicle hydraulic master cylinder (not shown), piston 32 moves rightwardly, as viewed in FIG. 2, to move brake shoe 41 into frictional engagement with one side of disc 12. Thereafter, pressure reaction, i.e., fluid pressure in chamber 33 acting on the cylinder housing 30 after shoe 41 engages disc 12, moves the housing 30 leftwardly applying axial forces on the frame 22 by the engagement between housing abutments 37 and 37a and frame edge portions 29b 29b' to slide the housing 30 and frame 22 leftwardly whereby the pressure portion 22a moves the brake shoe 40 into frictional engagement with the opposite side of the disc 12. The torque exerted on shoe 41 by disc 12 is taken directly by arm 17 of the support member 11 due to the engagement between backing plate 43 and the flange 19 and extension 21. Torque exerted on shoe 40 by the disc 12 is transmitted to the frame 22 by the engagement between backing plate 42 and the wall 53 (FIG. 5) of the frame 22 and to the upper side wall of groove 34a of housing 30 (FIG. 2)

by the engagement thereof with edge portion 29a of the frame and then through the cylinder housing 30 to the flange 19 of arm 17 of the support member 11 due to the engagement between housing side wall 35 and side 56 of flange 19.

When the disc 12 is rotating in the reverse direction opposite the arrow in FIG. 2 and the brake is actuated torque exerted on shoe 41 is transmitted directly to flange 18 and extension 20 of arm 16 of the support 11 while torque from shoe 40 is transmitted through the frame 22 to the side wall groove 35a of the housing 30 and thence through the housing to the flange 18 of arm 16 by the engagement between housing side wall 34 and side 58 of flange 18.

The mounting studs 65 and hold-down rods 50, 51 do not take the braking torque in either direction of disc rotation.

It will be apparent that the opposed sides 34 and 35 of the housing 30 and the sides 56 and 58 (FIG. 1) of the flanges 18 and 19 which are slidably engaged by the housing sides 34 and 35 to provide a relatively long guide for the housing 30 and frame 22 of unit 10. The axial length of the surfaces of housing sides 34 and 35 that are in engagement with flange sides 56 and 58 is substantially greater than the thickness of the support 11 and frame 22. Because these engaging guide surfaces between the housing 30 and flanges 18 and 19 of support 11 are relatively long the amount of freedom of angular movement or rotation of frame 22 in its own plane as a result of manufacturing tolerances and stresses on parts is very small.

Because there is very little or substantially no freedom of rotation of unit 10 including frame 22 relative to support 11 moments produced by the transfer of torque from shoe 40 to the frame 22 tending to angularly move or rotate frame 22 are opposed by support 11 instead of pad 44 to thereby reduce or substantially minimize angular or taper wear of the wear face thereof. Thus the friction pads 44 and 45 will wear relatively evenly over the wear life thereof.

Also, the relatively long sliding engagement between the housing walls 34 and 35 flange sides 56 and 58 provide relatively large torque-transferring surfaces for good distribution of the torque transferred from the housing 30 to a flange during braking operations.

Since housing 30 is mounted for axial movement toward and away from disc 12 there is, of course, some room for movement or play of housing 30 between the flanges 18 and 19. The unit 10 could, therefore, move up and down between flanges 18 and 19 causing "rattle" noise as the vehicle wheel passed over road bumps and the like if the brake unit 10 was not restrained against such movement. In the illustrated embodiment, and antirattle device 80 is connected between unit 10 and support 11 to resiliently urge or bias unit 10 against support 11 so as to restrain it against up and down movement and reduce or substantially obviate rattle noise.

The antirattle device 80 includes a connection member or arm 82 mounted at one end to support 11 by providing an opening 83 therein which receives the lower mounting stud 65 (FIGS. 2 and 6). Arm 82 extends across the outer periphery of disc 12 to the pressure portion 22a with the other end thereof slightly upturned and provided with an opening 84 which receives the lower bent end of a spring 86. The member 82 engages member 21 of the support 12 and is effectively a stationary extension of support 12. Spring 86 is connected at its upper end to the brake unit 10 by its connection with rod 50 which is provided with an opening 88 that receives the upper bent end of the spring. Where desired or necessary, the upper end of spring 86 may be connected directly to frame portion 22a, for example by providing an opening therein for receiving and holding the upper end of the spring.

The force of spring 86 is in a direction chordwise of the disc 12 and generally parallel to the plane of the disc. The unit 10 is urged downwardly by spring 86 with the housing 30 engaging the lower flange 19 to prevent or retard upward movement of unit 10 relative to support 11 when subjected to shock, such as caused by bumpy road conditions, and thereby reduce or substantially obivate rattle noise.

With the arrow in FIG. 1 representing the direction of rotation of disc 12 during forward vehicle movement, the lower or trailing end portion of a new pad 44 will generally wear at first at a slightly greater rate than the upper or leading end portion thereof. This is because of the previously mentioned moment tending to rotate the unit 10 (about flange 19) in a clockwise direction (FIG. 2) as a result of the transfer of torque from brake shoe 40 to frame portion 22a. Because the force of spring 86 also produces a moment tending to rotate unit 10 about flange 19 in generally the same or clockwise direction, the tapered wear face of pad 44 after some wear thereof will tend to be maintained parallel to the engaging disc side. With the wear face of pad 44 more closely parallel to the disc side, the shoe 40 will generally remain closer to the disc 12 when the brake is de-energized and this will result in less pressure fluid displacement and brake pedal travel during brake applications.

Since the force of spring 86 is substantially parallel to the plane or rotation of disc 12, it tends to move frame 22 chordwise of the disc rather than axially in either direction. In this way, spring 86 does not tend to cause drag between shoe 40 and the disc 12 or between shoe 41 and the disc when the brake is de-energized. Preferably, when the shoes 40 and 41 are new, as shown in FIG. 2, the upper end of spring 86 is spaced slightly farther to the right of disc 12 than is the lower stationary end thereof and such that after the friction pads 44 and 45 are fully worn, the upper spring end will be closer to the disc 12 than the lower spring end. In this way, the spring 86 is located such that the change in the direction of the force thereof over the life of the friction pads 44 and 45 is minimized, i.e., the force of spring 86 is maintained substantially parallel to the disc 12 over the life of pads 44 and 45.

From the foregoing, it is now apparent that a novel disc brake meeting the objects and advantageous features set forth hereinbefore, as well as other objects and advantages, is provided and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows.

I claim:

1. A disc brake for use with a rotatable disc comprising a stationary support member mounted adjacent one side of said disc and having a pair of spaced apart integral flanges each extending away from and in a plane normal to the plane of said disc, a pair of friction elements disposed on opposed sides of said disc, a closed loop member surrounding said friction elements and a chordal portion of said disc and including actuating means for moving one of said friction elements axially in one direction into frictional engagement with said disc and said loop member in the opposite direction to move the other of said friction members into frictional engagement with said disc, said closed loop member having a pair of slots therein, and connection means mounting said closed loop member to said support member for axial movement including a pair of threaded studs connected respectively to said flanges and respectively extending through said slots, a pair of spacer means, said spacers being respectively disposed on said studs with one end of each abutting the respective flanges and with a portion of said closed loop member disposed between each flange and the other end of the spacer means, and means including nuts on said studs securing said spacer means between said nuts and flanges, each of said spacer means having a length greater than the thickness of said closed loop member portions and providing a predetermined amount of freedom of movement for said closed loop member, resilient means connected between said members for resiliently urging said closed loop member in a direction chordwise of said disc, said resilient means including a connection member extending across the periphery of said disc with one end connected to one of said studs, and spring means having one end connected to the other end of said connection member and the other end of said spring means connected to said closed loop member.

2. A friction device for use with a rotatable disc comprising support means adapted to be mounted adjacent to said disc, a pair of friction elements respectively adjacent to the opposed sides of said disc for frictional engagement therewith, means substantially axially movable on said support means for urging said friction elements into frictional engagement with said disc opposed sides, a pair of spaced slot means in said movable means, a pair of studs extending through said slot means and having one of their opposed end portions connected with said support means, respectively, a pair of spacer means each having an enlarged portion press-fitted through said slot means, a pair of groove means in said spacer means adjacent to said enlarged portions thereof slidably engaged with said movable means and each having opposed side walls for displacement preventing engagement with said movable means about said slot means when said enlarged portions are press-fitted therethrough, respectively, opposed ends on each of said spacer means, an opening in each of said spacer means between said opposed ends thereof and respectively received on said studs, and other means removably connected with the other opposed end portions of said studs and engaged with the other of the opposed ends of said spacer means, respectively, to retain said movable means against displacement from said support means.

3. A disc brake for use with a rotatable disc connected for rotation with a wheel of a vehicle comprising a stationary support member adjacent to one side of said disc and having a pair of flanges spaced apart chordwise of said disc and extending in a plane chordwise of said disc, a pair of friction elements respectively adjacent to the opposed sides of said disc, a movable member including a closed loop frame member in a plane chordwise of said disc and having portions thereof on the opposed sides of said disc, said frame surrounding said friction elements and a chordal portion of said disc on the radially outer side of said flanges, and brake actuating means between one of said frame portions and one of said friction elements for axially moving said one friction element in one direction into engagement with said disc and said frame axially in the opposite direction to move the other of said friction elements into engagement with said disc, mounting means for connecting said frame member to said support member for axial movement including a pair of fastening means respectively connecting opposed ends of said one frame portion to said flanges for axial sliding movement relative thereto, and resilient means including an arm connected at one end to one of said fastening means and extending across the periphery of said disc to the other of said frame portions, and a spring connected at one end to said frame portion and the other end to the other end of said arm to apply a biasing force on said movable member.

4. The disc brake according to claim 3, wherein said arm engages said support member to limit movement of said arm in the direction of the force of said spring.

5. The disc brake according to claim 3, wherein said mounting means further includes a pair of spacers respectively disposed on said fastening means to predeterminately space portions of said fastening means relative to said flanges and provide a predetermined amount of freedom of movement of said movable member in a generally radial direction relative to said disc.

6. The disc brake according to claim 3, wherein said biasing force is in a chordwise direction and generally toward the direction of rotation of said disc when the vehicle is moving in its forward direction.

7. A disc brake for use with a rotatable disc connected to a vehicle wheel for rotation therewith comprising a stationary support connected adjacent to one side of said disc and having a pair of spaced apart arms each including a flange in a plane chordwise of said disc, a pair of friction elements disposed respectively on opposed sides of said disc, a movable member including a generally flat closed loop frame member in a plane chordwise of said disc and having interconnected portions on opposed sides of said disc, said frame surrounding said friction elements and a chordal portion of said disc on the radially outer side of said flanges, one of said frame portions having a pair of axially extending chordwise spaced slots therein, and brake actuating means between said one frame portion and one of said friction elements for axially moving said one friction element into engagement with said disc and said movable member axially in the opposite direction to move the other of said friction elements into engagement with said disc upon actuation of said actuating means, and means mounting said movable member for axial movement including means on said movable member between said flanges and guided thereby for axial movement, a pair of spacers each having an opening therethrough and respectively disposed in said slots, and a pair of fastening means respectively disposed in said openings and connecting said spacers to said flanges, each of said spacers providing a predetermined amount of space for movement of said movable member, resilient means including an arm connected at one end to one of said fastening means and extending across the outer periphery of said disc, and a spring connected between said frame and the other end of said arm to apply a constant force on said movable member to oppose movement thereof due to shock transmitted to the vehicle wheel.

8. The disc brake according to claim 7, wherein said frame member further includes at least one hold-down member connected between said frame portions and engaging said friction elements for precluding movement of said friction elements from between said frame portions, said spring being connected at one end to said hold-down member and at the other end thereof to the other end of said arm.

9. A friction device for use with a rotatable disc comprising support means adapted to be mounted adjacent to said disc and including a pair of spaced anchor means, a pair of friction elements respectively adjacent to the opposed sides of said disc for frictional engagement therewith, means movable on said support means for respectively urging said friction elements into frictional engagement with the opposed sides of said disc including a member having portions thereof on the opposed sides of said disc, and other means normally urging said movable means toward engagement with one of said anchor means including means connected to said support means on one of the opposed sides of said disc and extending across the periphery of said disc, and resilient means connected between said last-named means and a portion of said member on the other of the opposed sides of said disc.

10. A friction device according to claim 9, wherein said movable means includes at least one retaining means connected between said member portions on the opposed sides of said disc and extending over the periphery of said disc in engagement with at least one of said friction elements to prevent radial displacement thereof relative to said friction device, said resilient means being connected at one end with said retaining means and at the other end thereof to said last-named means.

11. A friction device according to claim 9, wherein said last named means includes an end pivotally connected with said support means on said one opposed side of said disc, and another end opposed to said first-named end connected with said resilient means on said other opposed side of said disc.

12. A friction device according to claim 11, wherein said resilient means comprises a spring having one end connected with said member portion on said other opposed side of said disc and the other end thereof connected with said other end of said last-named means.

13. A friction device according to claim 12, wherein said last-named means also includes an intermediate portion between said first named and other ends for abutting engagement with a portion of said support means, the compressive force of said spring normally urging said intermediate portion into abutting engagement with said support means portion.

14. A friction device according to claim 9, comprising a fulcrum portion on said support means, the force of said resilient means normally urging said last-named means into engagement with said fulcrum portion.

15. A friction device according to claim 14, wherein said last-named means includes an arm movable on said movable means, said arm having an intermediate portion extending across the periphery of said disc and also engaged with said fulcrum portion of said support means, opposed end portions on said arm respectively on said one and other opposed sides of said disc and interconnected by said intermediate portion, one of said opposed end portions being pivotally connected with said support means on said one opposed side of said disc, and the other of said opposed end portions being connected with said resilient means on said other opposed side of said disc, and said resilient means including a spring on said other side of said disc having one end connected with said member portion on said other opposed side of said disc and the other end thereof connected with said other end portion of said arm; the force of said spring urging said intermediate portion of said arm toward engagement with the fulcrum portion of said support means and urging said movable means toward engagement with said one anchor means.

16. A friction device for use with a rotatable disc comprising support means adapted to be mounted adjacent to said disc, a pair of friction elements respectively adjacent to the opposed sides of said disc for frictional engagement therewith, means substantially axially movable on said support means for urging said friction elements into frictional engagement with said disc opposed sides, slot means in said movable means, and hold-down means connected between said support and movable means to substantially obviate radial displacement movement therebetween and permit the axial movement of said movable means including a portion press-fitted through said slot means into displacement preventing engagement with said movable means.

17. A friction device according to claim 16, wherein said hold-down means comprises mounting means on said support means and extending through said slot means, spacer means movable in said slot means and removably engaged with said mounting means, said included portion being on said spacer means, and other means removably secured to said mounting means and engaged with said movable means to substantially obviate the radial displacement movement between said support and movable means.

18. A friction device according to claim 17, comprising groove means in said spacer means having spaced side walls for displacement preventing engagement with said movable means about said slot means when said included portion is press-fitted through said slot means.

19. A friction device according to claim 18, comprising opposed ends on said spacer means, an opening in said spacer means between said opposed ends, said mounting means being received in said opening, one of said opposed ends being in abutting engagement with said support means, and said other means being engaged with the other of said opposed ends.

References Cited
UNITED STATES PATENTS

| | | |
|---|---|---|
| 3,065,829 | 11/1962 | Bessler et al. |
| 3,158,230 | 11/1964 | Chouings. |
| 3,211,261 | 10/1965 | Chouings. |
| 3,335,820 | 8/1967 | Burnett. |

GEORGE E. A. HALVOSA, Primary Examiner

U.S. Cl. X.R.

188—203